(12) United States Patent
Shore et al.

(10) Patent No.: US 7,247,966 B2
(45) Date of Patent: Jul. 24, 2007

(54) FLEXIBLE ROTOR POLE CROSSOVER FOR A GENERATOR

(75) Inventors: David Shore, Gastonia, NC (US); Phillip Keaton, Rock Hill, SC (US)

(73) Assignee: Siemens Power Generation, Inc., Orlando, FL (US)

(*) Notice: Subject to any disclaimer, the term of this patent is extended or adjusted under 35 U.S.C. 154(b) by 62 days.

(21) Appl. No.: 10/875,423

(22) Filed: Jun. 24, 2004

(65) Prior Publication Data
US 2005/0285469 A1 Dec. 29, 2005

(51) Int. Cl.
H02K 11/00 (2006.01)
H02K 3/00 (2006.01)
H02K 1/00 (2006.01)
H02K 1/22 (2006.01)
H02K 3/46 (2006.01)

(52) U.S. Cl. .................. 310/179; 310/71; 310/261; 310/270

(58) Field of Classification Search ............... 310/179, 310/270, 261, 260, 180, 271, 71; 439/9; 174/86, 75 F, 97, 102 SP
See application file for complete search history.

(56) References Cited
U.S. PATENT DOCUMENTS

| | | | | |
|---|---|---|---|---|
| 3,422,213 A | * | 1/1969 | Boodley et al. | 174/72 R |
| 4,605,873 A | | 8/1986 | Hahn | |
| 4,870,308 A | * | 9/1989 | Sismour, Jr. | 310/71 |
| 5,039,896 A | * | 8/1991 | Adams et al. | 310/71 |
| 5,065,059 A | * | 11/1991 | Adams et al. | 310/71 |
| 5,111,097 A | | 5/1992 | Longergan et al. | |
| 5,298,823 A | | 3/1994 | Johnsen | |
| 6,011,389 A | | 1/2000 | Masreliez et al. | |
| 6,232,681 B1 | | 5/2001 | Johnston et al. | |
| 6,254,027 B1 | | 7/2001 | Kunou | |
| 6,280,265 B1 | * | 8/2001 | Hopeck et al. | 439/843 |
| 6,465,928 B1 | | 10/2002 | Shervington et al. | |
| 6,531,797 B2 | | 3/2003 | Eydelie et al. | |
| 6,700,276 B2 | | 3/2004 | Hakamata | |
| 6,930,434 B1 | * | 8/2005 | Spencer et al. | 310/270 |
| 2004/0217662 A1 | * | 11/2004 | Zhang et al. | 310/71 |
| 2004/0256941 A1 | * | 12/2004 | Yoneda et al. | 310/179 |
| 2005/0200214 A1 | * | 9/2005 | Zhang et al. | 310/71 |

* cited by examiner

Primary Examiner—Burton S. Mullins
Assistant Examiner—Erik Preston

(57) ABSTRACT

A generator includes a shaft and rotor body defining poles and a winding positioned around the shaft on the rotor body. A rotor pole crossover is aligned to the shaft and connects ends of the winding between adjacent poles. The rotor pole crossover includes a body member having a curved medial section and opposing legs extending outwardly from the curved medial section that connect to the ends of the winding. The curved medial section has at least one slot formed therein to add flexibility to the rotor pole crossover.

14 Claims, 6 Drawing Sheets

OUTBOARD END

FLEXIBLE ROTOR POLE CROSSOVER FOR A GENERATOR

FIELD OF THE INVENTION

The present invention relates to generators, and more particularly, to rotor pole crossovers used in generators.

BACKGROUND OF THE INVENTION

A generator typically includes a shaft and rotor body supported by the shaft. The rotor body defines a number of poles, which vary in number depending on the design of the generator. For example, the speed at which the shaft rotates and frequency of electric current to be produced would impact the number of poles used in the generator. In a generator, copper wire is wound along the poles on the rotor body and referred to as the winding. In most large generators, for example, such as used in power generation plants and other similar generator applications, the cooper wire can be formed as flat, stiff, coiled copper bars. In some cases, the copper winding is about 1 by 0.25 inches in cross-section, as one non-limiting example. These coils forming the winding are often referred to as the conductors.

The winding is designed to form a complete circuit from a first pole to the last pole. Because the winding is formed from a stiff material in these large generators, the winding ends are connected between adjacent poles with conductive jumpers known as rotor pole crossovers.

As noted in commonly assigned U.S. Pat. No. 5,111,097, the disclosure which is hereby incorporated by reference in its entirety, rotor pole crossovers are designed in many shapes and sizes and change in design as the generator design requirements dictate. For example, some rotor pole crossovers have been designed as rings that encircle the shaft. Other rotor pole crossovers are designed as short crossovers in the form of flat plates or reverse S-shapes, which are oriented to lie axially relative to the rotor shaft. During generator operation, large centrifugal forces are exerted on the winding and rotor pole crossover, for example, by daily starts and stops to accommodate peak on and off electrical generation demands, and as a result, the rotor pole crossovers undergo stressful cyclic duty. If rotor pole crossovers lack flexibility, they crack and cause a loss in the generator electrical field.

A cracked rotor pole crossover can be repaired by removing the end plate and retaining ring on a generator, and replacing the cracked rotor pole crossover with a new crossover. The new rotor pole crossover is fitted into its proper position and secured into the coil position using brazed scarf or lap joints, for example, such as explained in the '097 patent. The retaining ring and end plate are then reattached. Some laminated rotor pole crossovers have been proposed as replacements for a number of crossovers. These replacement crossovers typically have an extended U-shaped segment (also referred to as an omega depending on its design). Two leg extensions connect to the U-shaped segment and connect to the winding ends via respective lap or scarf joints at the free ends of the legs. A laminated crossover is discussed in the background section of the '097 patent. A laminated crossover differs from flat plates of reverse S-shaped crossovers because the installed, laminated crossover extends radially outward with respect to the shaft, as opposed to being oriented axially with respect to the shaft. Unfortunately, a laminated rotor pole crossover usually cannot be installed axially. If lap joints are connected to the winding end, any attempt to rotate the laminated rotor pole crossover for axial orientation would exert a greater load on the laminations and they would buckle. Cracking would still be a problem.

The '097 patent proposes a rotor pole crossover that can be oriented axial relative to the shaft of the generator, while having greater flexibility and reducing stress. This improved crossover has a variable thickness to create flexibility, and has an extended, substantially U-shaped segment from which two legs curve outwards. This rotor pole crossover is thinned in one direction relative to its leg thickness, but thickened in another direction to create flexibility and reduce stress. It maintains a constant cross-sectional area for proper electrical conduction.

As shown in FIG. 5 of the '097 patent, the rotor pole crossover disclosed in that patent was designed for connection into coil no. 6. FIG. 5 illustrates that there is ample space for a crossover design having an extended U-shaped segment that is long compared to its width.

There are some instances, however, when a rotor pole crossover has to be connected into an area having a much smaller space than that disclosed in the '097 patent. For example, if the rotor pole crossover must be connected to the first coil shown at right of FIG. 5, there is little room for a rotor pole crossover as disclosed in the '097 patent. This can be a problem with numerous older generation generators. Also, laminated rotor pole crossovers are not practical because they are not installed axially. Even if sized correctly to be connected to the first coil, any rotor pole crossover design must also be flexible. Longer rotor pole crossovers, such as disclosed in the '097 patent, have enhanced flexibility because of their length, but crossovers limited in size would not have as much inherent flexibility even if the crossover included thickened and thinned sections.

SUMMARY OF THE INVENTION

It is therefore an object of the present invention to provide a rotor pole crossover that overcomes the disadvantages as described above.

It is another object of the present invention to provide a rotor pole crossover that can be placed into a limited space, such as connected into the first coil, as compared to prior art rotor pole crossover designs that are connected into the 5th or 6th coil.

The present invention is advantageous over brazing together individual laminations and provides a rotor pole crossover that can be used in restrictive and tight quarters, such as connecting into a first coil in those generators where any crossover connected to the first coil is necessarily small. The rotor pole crossover of the present invention has excellent flexibility when restricted to a single circumferential plane and is less expensive than traditionally laminated rotor pole crossovers that are also more difficult to install and manufacture and do not fit into available spaces, such as when connected into the first coil. Other prior art omega and U-shaped rotor pole crossovers would not provide the flexibility as compared to the rotor pole crossover of the present invention per unit of current carrying cross-section.

In one aspect of the present invention, a generator includes a shaft and rotor body supported by the shaft and defining poles. A winding is positioned around the shaft on the rotor body at the poles. A rotor pole crossover is preferably aligned to the shaft and connects ends of the winding between adjacent poles. The rotor pole crossover of the present invention includes a body member having a curved medial section and opposing legs extending outwardly from the curved medial section with free ends that connect to ends of the winding. At least one slit (i.e., slot) is formed within the curved medial section and adds flexibility to the rotor pole crossover.

In one aspect of the present invention, three slots are formed within the curved medial section and extend completely through the body member. The at least one slot extends between the legs within the curved medial section, while the body member is formed as a plate that has a substantially constant cross-sectional thickness. The curved medial section is preferably U-shaped and the legs comprise at least one scarf joint at a free end of the leg for interconnecting an end of a winding. The legs are also substantially rectangular configured when looking at the legs from the plan view.

The rotor pole crossover of the present invention is smaller in dimension as compared to prior art rotor pole crossovers, for example, as disclosed in the '097 patent, and can be connected into the first coil patent of the winding and oriented axially relative to the shaft.

A method for replacing an original rotor pole crossover of a generator is also disclosed and comprises the steps of removing an end plate of the generator, disconnecting and removing the original rotor pole crossover from the winding ends, and inserting a new rotor pole crossover of the type as described above for the present invention.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figures 1, 2:
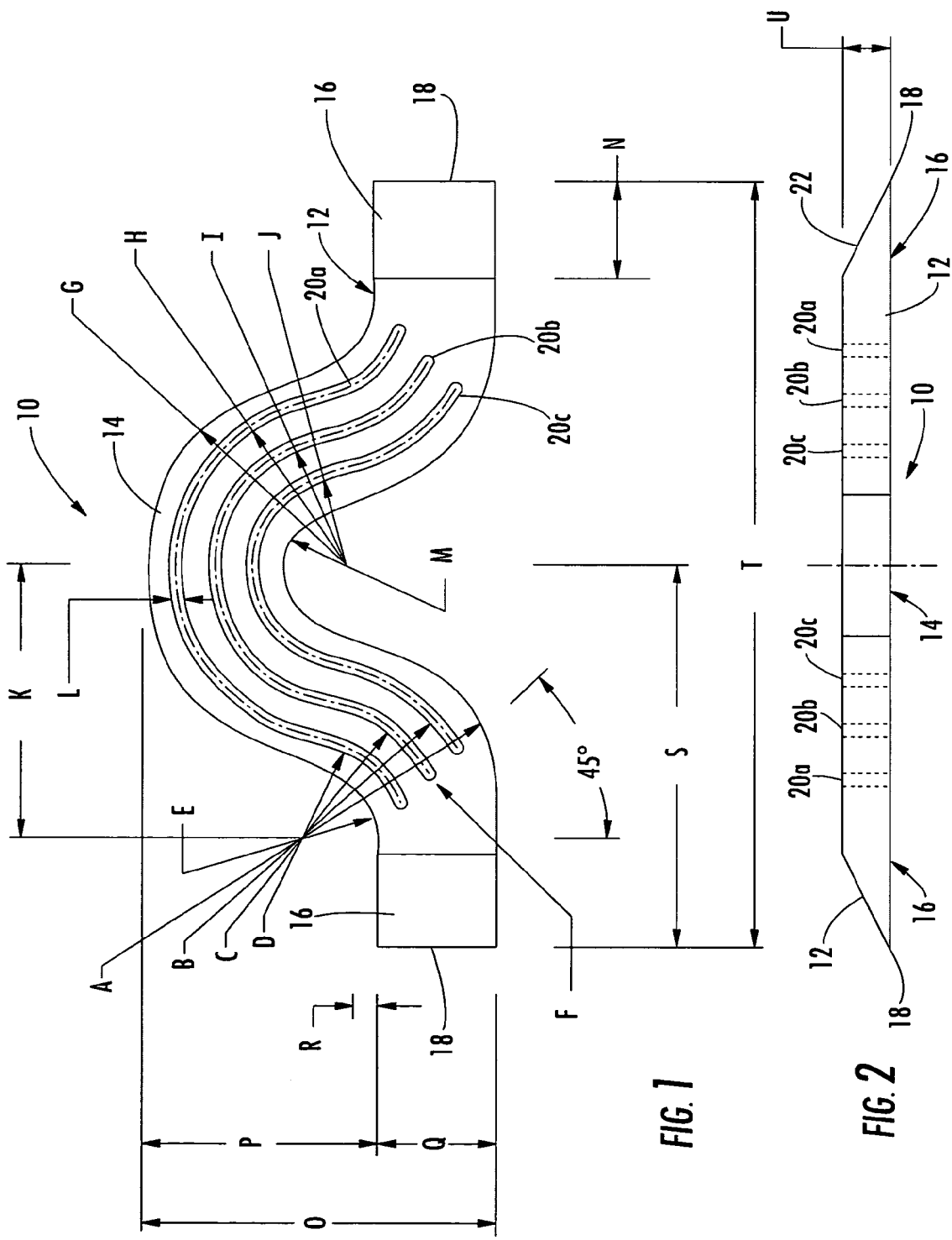
FIG. 1 is a top plan view of the rotor pole crossover of the present invention and showing slots formed in the curved medial section for imparting flexibility to the crossover.
FIG. 2 is a front elevation view of the rotor pole crossover shown in FIG. 1.

The present invention advantageously provides a rotor pole crossover 10 that can be positioned and connected in close confines and small spaces, such as connected to coil 1 of a winding in some older designed generators. FIGS. 1 and 2 illustrate the respective top plan and front elevation views of the rotor pole crossover 10 of the present invention. The rotor pole crossover includes a body member 12 having a curved medial section 14 and opposing legs 16 that extend outwardly from the curved medial section. Each leg 16 includes a free end 18, which is configured to connect to an end of the winding. The curved medial section 14 has at least one slot 20a formed therein that adds flexibility to the rotor pole crossover. In a preferred aspect of the present invention, three slots 20a, 20b, 20c are formed within the rotor pole crossover at its curved medial section 14 and extend between the legs 16 and completely through the body member 12 as best shown in FIG. 2. The slots 20a, 20b, 20c, also referred to as slits, can be formed by known machining and other manufacturing techniques, including milling. Although the slots are shown as extending through the body member, if the slots are formed as deep grooves, which do not extend completely through, but still allow flexibility, then completely milled slots may not be required.

The body member 12 is preferably formed as a substantially planar plate that has a substantially constant cross-sectional thickness. The plate can be formed form different materials, but preferably copper or similar alloy or other conductive material is used. The legs 16 are preferably substantially rectangular configured as shown in FIG. 1, and include a taper 22 at a free end. This taper allows the formation of at least one scarf joint as one technique for connecting into the coil. Different connection techniques can be used, including a brazing connection such as disclosed in the '097 patent for use with lap or scarf joints. The three slots extend along the curved medial section and are wide enough to impart the required flexibility to the structure. The rotor pole crossover can be oriented axially relative to the shaft in its configuration. As illustrated, the three slots 20a, 20b, 20c are preferably parallel to each other. It should be understood, however, that different slot designs can be used to add flexibility.

FIGS. 1 and 2 show only one non-limiting example of a rotor pole crossover design of the present invention. It is machined or manufactured out of flat plate with the slots or slits being milled into the curved medial section. For purposes of description and example only, dimensions of the illustrated rotor pole crossover that can be used commercially in an older version generator are set forth relative to FIGS. 1 and 2. It should be understood that the illustrated design and its dimensions are specific to one generator and connection to its first coil. Other generator designs may dictate a different rotor pole crossover design of the present invention with different dimensions. The dimensions in this one non-limiting example are listed below. The dimensions are referenced to specific letters as shown in FIGS. 1 and 2 and refer to inches and radii.

A=R 2.190
B=R 1.860
C=R 1.40
D=R 1.080
E=R 0.750

F=R 0.060 TYP
G=R 2.120
H=R 1.790
I=R 1.400
J=R 1.010
K=2.821
L=0.120 TYP
M=R 0.680
N=1.000 TAPER
O=3.640
P=2.340 REF
Q=1.300
R=0.220
S=4.000
T=8.000
U=0.460

Figure 3:
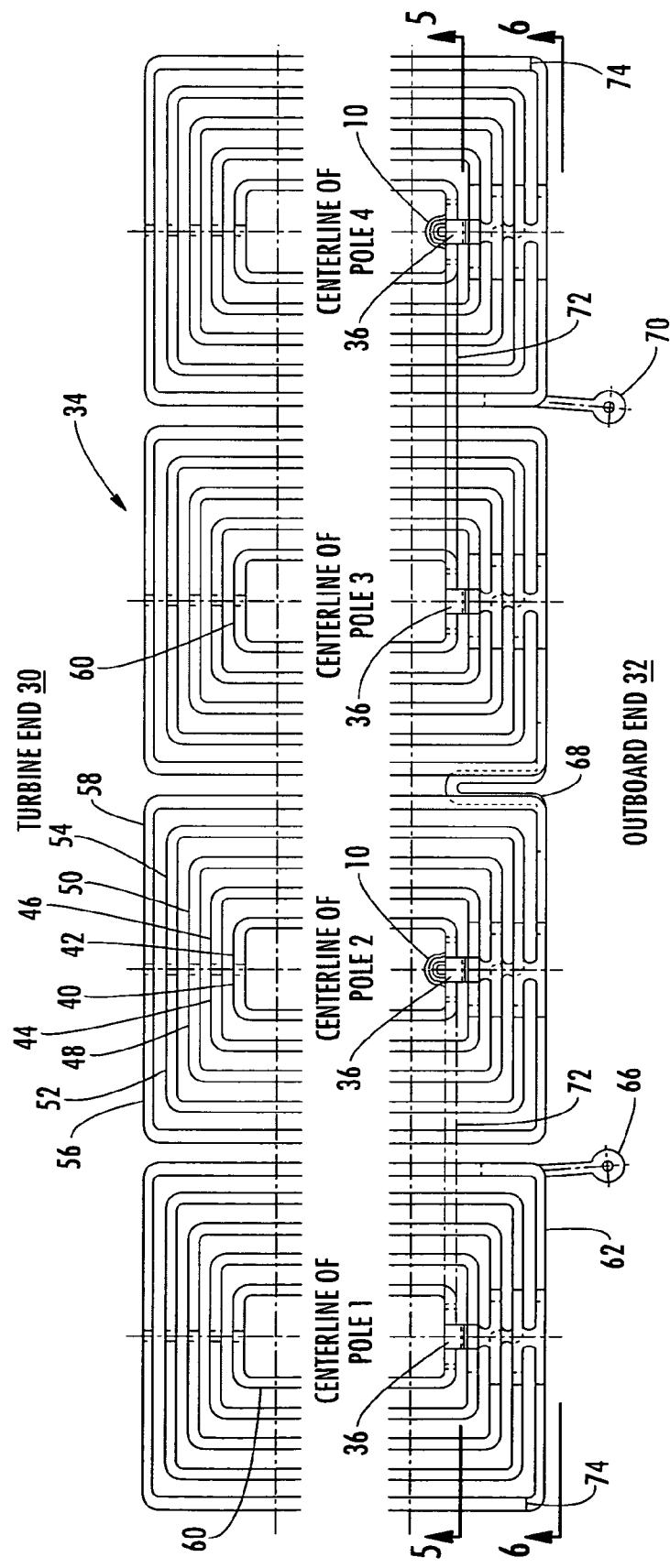
FIG. 3 is a fragmentary, longitudinal partial sectional view of the turbine end and outboard end of the rotor winding assembly that incorporates the rotor pole crossover of the present invention and connected into coil no. 1.
Figure 4:
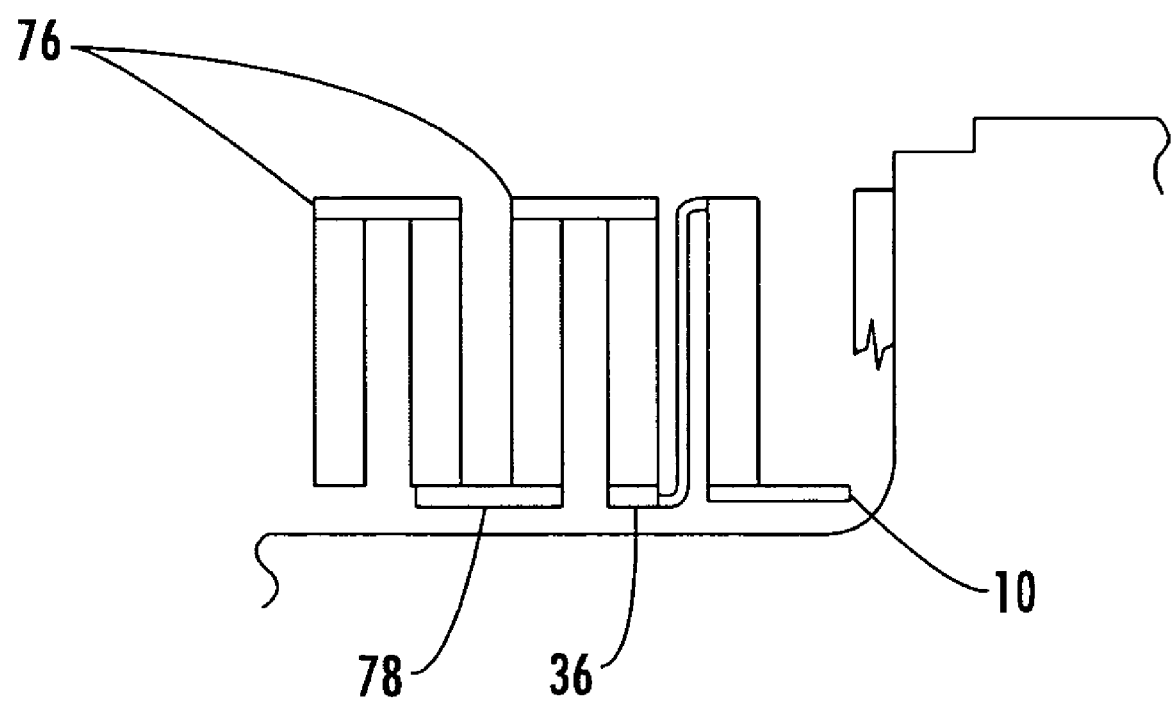
FIG. 4 is an enlarged view of the outboard end of the rotor winding invention and showing another view of the rotor pole crossover of the present invention connected into coil no. 1.
Figure 5:
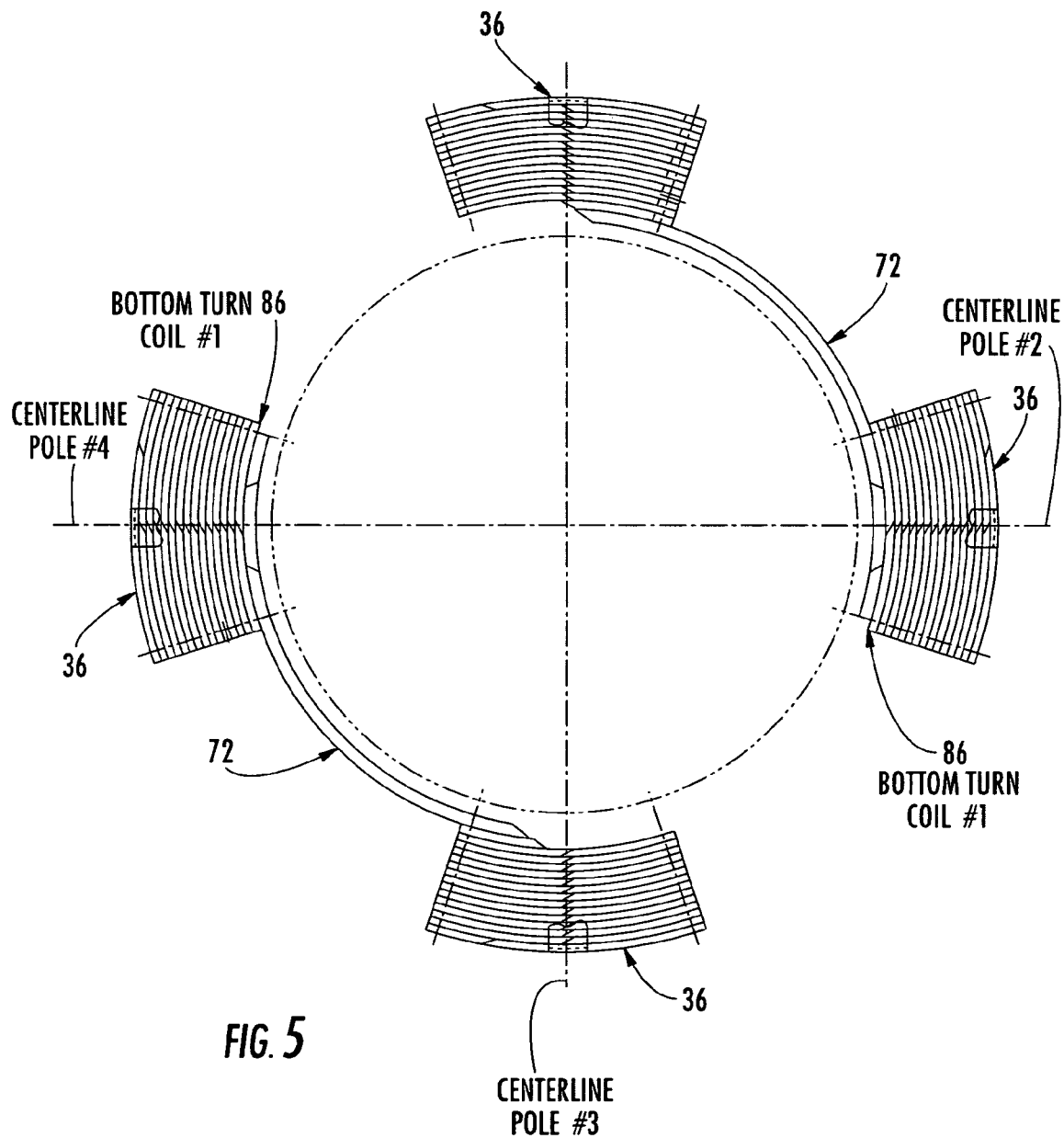
FIG. 5 is a fragmentary, cross-sectional view of the rotor winding assembly taken along line 5-5 of FIG. 3.

FIG. 3 is a fragmentary, longitudinal partial sectional view of the turbine end 30 and outboard end 32 of the rotor winding assembly 34 and showing the location of the rotor pole crossover 10 of the present invention relative to the jumper 36 for coil no. 1 to coil no. 2 and relative to the center line of pole no. 2 and the center line of pole no. 4. FIG. 3 shows the respective left-hand half coil 40 and right-hand half coil 42 for coil 1, and the left-hand half coils and right-hand half coils for coil 2, coil 3, coil 4, and coil 5. These remaining half coils are numbered 44-58 respectively. These coils can include any conolite and adhesive thermoset adhesive 60, as known to those skilled in the art. Turn 16 for coil no. 5 62 and a copper strap 74 are illustrated. The "J" lead 66 for pole no. 1 is illustrated. The coil no. 5 rotor pole crossover 68 is shown on the outboard end. The "J" lead 70 for pole no. 4 is illustrated and the pole connector 72 for coil no. 1. A copper strap 74 is shown to its right side. An enlarged view of the outboard end is shown in FIG. 4 and shows the top series lead 76, the bottom series lead 78 and the jumper for coil no. 1 to coil no. 2 36. The rotor pole crossover 10 for coil no. 1 is shown in its elevation in this view. A sectional view taken along line 5-5 of FIG. 3 shows in FIG. 5 the rotor winding assembly 34 and shows the bottom turn 80 of coil no. 1, and the center line of each of the pole no. 1, pole no. 2, pole no. 3, and pole no. 4. The pole connector 72 for coil no. 1 is illustrated, including the jumper 36 for coil no. 1 to coil no. 2.

Figure 6:
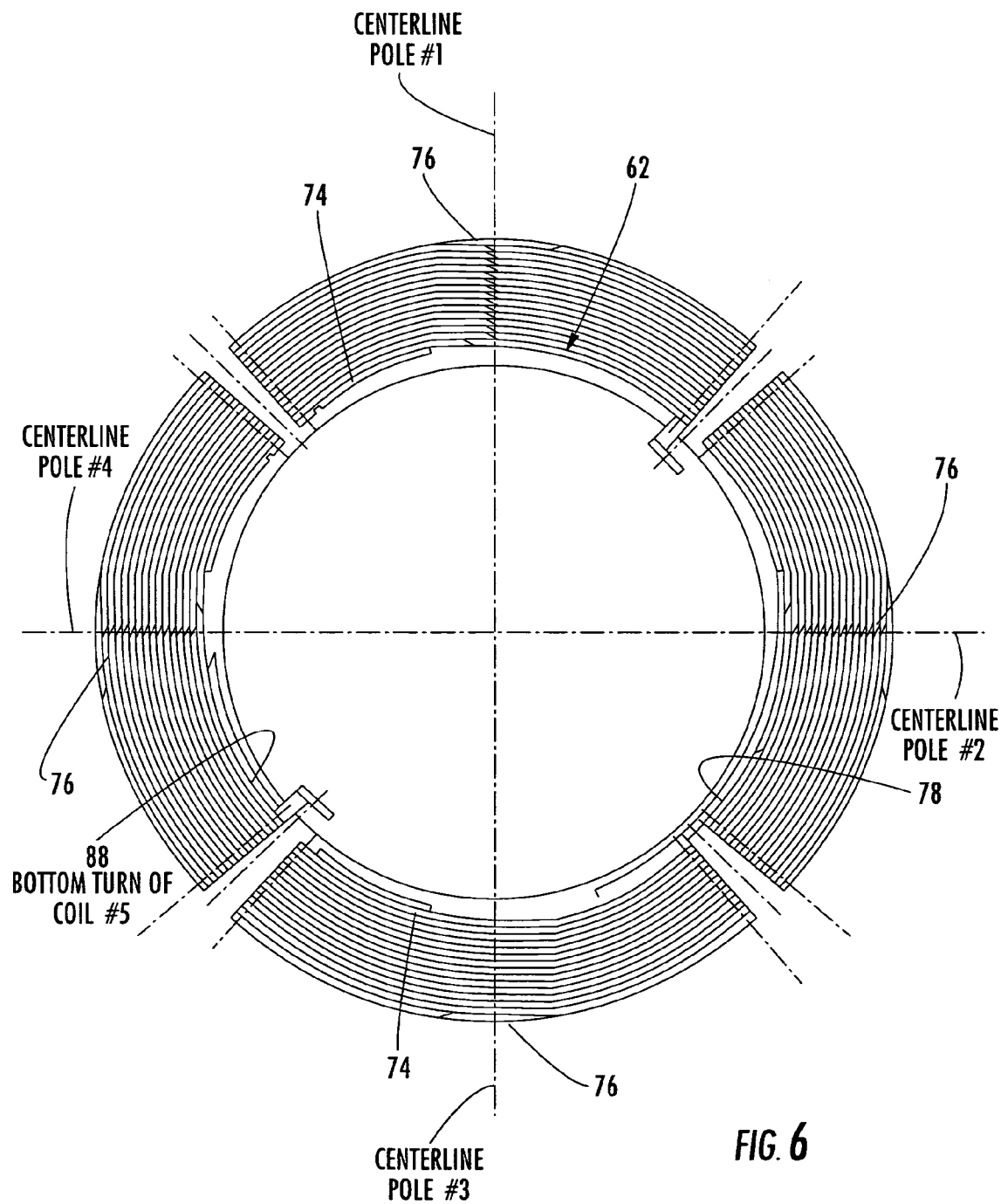
FIG. 6 is a fragmentary, cross-sectional view of the rotor winding assembly taken along line 6-6 of FIG. 3.

FIG. 6 shows the sectional view taken along line 6-6 of FIG. 3 and showing the top series lead 76, a copper strap 74, the bottom series lead 78, another copper strap 74, and the turn 16 for coil no. 5.

Figure 7:
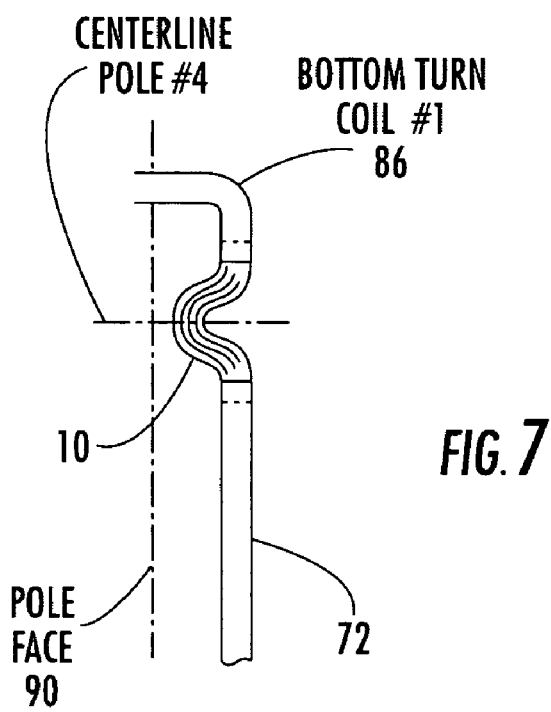
FIG. 7 is a fragmentary plan view of the rotor pole crossover of the present invention connected to the bottom turn of coil no. 1 and the pole connector of coil no. 1, and showing its position relative to the center line of pole no. 4 and the pole face.
Figure 8:
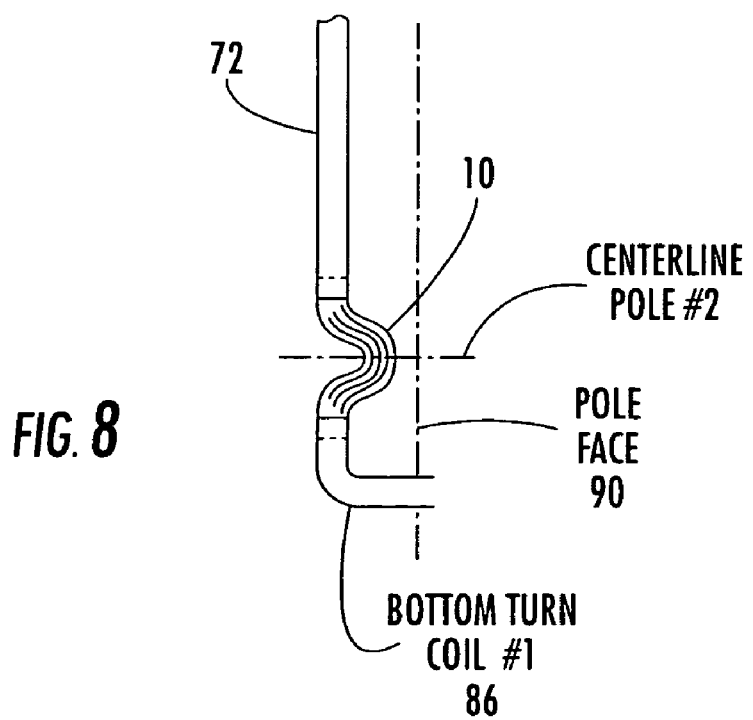
FIG. 8 is a view similar to FIG. 7, but showing the rotor pole crossover connected to the pole connector of coil no. 1 and the bottom turn of coil no. 1 relative to the center line of pole no. 2.

FIGS. 7 and 8 are enlarged views showing the respective center lines of pole no. 4 and pole no. 2 and the pole face 90, and showing the bottom turn of coil no. 180, the pole connected to coil no. 1, and both connected to the rotor pole crossover 10 of the present invention.

It is evident that the present invention now provides a rotor pole crossover that can be fitted into small spaces, such as connected to the first coil of many generators, including that style used with older style generators that often have limited space for rotor pole crossovers. The rotor pole crossover of the present invention provides adequate flexibility as compared to prior art laminated and other rotor pole crossovers that have been used in prior art applications.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A generator, comprising:
a rotor body defining poles;
a winding on said rotor body; and
a rotor pole crossover connecting ends of the winding between adjacent poles, said rotor pole crossover comprising a substantially U-shaped body member having a curved medial section and opposing legs extending outwardly from the curved medial section that connect to the ends of the winding, wherein said body member is formed as a planar plate that has a constant cross-sectional thickness and said curved medial section and at least a portion of each of said opposing legs having a plurality of slots formed therein and adding flexibility to the rotor pole crossover, wherein said curved medial section and legs have a constant dimension between inner and outer walls in a radial direction and a constant thickness between the top and bottom, and at least one of said legs being tapered at an end for forming a joint and connecting into a coil.

2. A generator according to claim 1, wherein the slot extends through said body member.

3. A generator according to claim 1, wherein said curved medial section has three slots formed therein.

4. A generator according to claim 1, wherein said rotor pole crossover is connected into coil one of the winding.

5. A generator according to claim 1, wherein said at least one slot extends between the legs within the curved medial section.

6. A generator according to claim 1, wherein said curved medial section is substantially U-shaped.

7. A generator according to claim 1, and further comprising at least one scarf joint formed at a leg for interconnecting an end of the winding.

8. A generator according to claim 1, wherein said legs are substantially rectangular configured.

9. A rotor pole crossover for a generator having a rotor body and defining poles and a winding on said rotor body, comprising:
a substantially U-shaped body member having a curved medial section and opposing legs extending outwardly from the curved medial section that are configured for connecting to the ends of a winding, wherein said body member is formed as a planar plate that has a constant cross-sectional thickness and said curved medial section and at least a portion of each of said opposing legs formed therein and adding flexibility to the rotor pole crossover, wherein said curved medial section and legs have a constant dimension between inner and outer walls in a radial direction and a constant thickness between the top and bottom, and at least one of said legs being tapered at an end for forming a joint and connecting into a coil.

10. A rotor pole crossover according to claim 9, wherein the slot extends through said body member.

11. A rotor pole crossover according to claim 9, wherein said curved medial section has three slots formed therein.

12. A rotor pole crossover according to claim 9, wherein said at least one slot extends between the legs within the curved medial section.

13. A rotor pole crossover according to claim 9, wherein said curved medial section is substantially U-shaped.

14. A rotor pole crossover according to claim 9, wherein said legs are substantially rectangular configured.

* * * * *